(12) United States Patent
Lee et al.

(10) Patent No.: US 11,613,160 B2
(45) Date of Patent: Mar. 28, 2023

(54) AIR CONDITIONER FOR VEHICLE

(71) Applicant: Hanon Systems, Daejeon (KR)

(72) Inventors: Jong Min Lee, Daejeon (KR); Dong Gyun Kim, Daejeon (KR); Si Hyung Kim, Daejeon (KR); Dae Keun Park, Daejeon (KR); Nam Jun Lee, Daejeon (KR); Ho Lee, Daejeon (KR); Jae Woo Ko, Daejeon (KR); Young Keun Kim, Daejeon (KR); Chang Soo Bae, Daejeon (KR); Hwan Kyu Cho, Daejeon (KR); Gyu Ik Han, Daejeon (KR); Heon Hur, Daejeon (KR)

(73) Assignee: Hanon Systems, Daejeon (KR)

( * ) Notice: Subject to any disclaimer, the term of this patent is extended or adjusted under 35 U.S.C. 154(b) by 590 days.

(21) Appl. No.: 16/662,698

(22) Filed: Oct. 24, 2019

(65) Prior Publication Data
US 2020/0130460 A1 Apr. 30, 2020

(30) Foreign Application Priority Data

Oct. 26, 2018 (KR) .......................... 10-2018-0128969
Sep. 6, 2019 (KR) .......................... 10-2019-0110479

(51) Int. Cl.
*B60H 1/00* (2006.01)
(52) U.S. Cl.
CPC ................. *B60H 1/00692* (2013.01)
(58) Field of Classification Search
CPC ........... B60H 1/00692; B60H 1/00857; B60H 1/00678
USPC ......................................................... 454/141
See application file for complete search history.

(56) References Cited

U.S. PATENT DOCUMENTS

| | | | |
|---|---|---|---|
| 6,032,723 A * | 3/2000 | Tsuihiji | B60H 1/00857 454/126 |
| 2007/0111651 A1 | 5/2007 | Sekito et al. | |
| 2013/0008203 A1 | 1/2013 | Makita et al. | |
| 2016/0023536 A1* | 1/2016 | Mazzocco | B60H 1/00678 62/404 |
| 2016/0243922 A1 | 8/2016 | Sekito et al. | |
| 2019/0315191 A1 | 10/2019 | Kang et al. | |
| 2020/0001679 A1* | 1/2020 | Akiyama | B60H 1/00857 |

(Continued)

FOREIGN PATENT DOCUMENTS

| | | |
|---|---|---|
| CN | 104216260 A | 12/2014 |
| DE | 102019105779 A1 | 9/2019 |
| JP | H09175147 A | 7/1997 |

(Continued)

*Primary Examiner* — Avinash A Savani
*Assistant Examiner* — Dana K Tighe
(74) *Attorney, Agent, or Firm* — Norton Rose Fulbright US LLP; James R. Crawford

(57) ABSTRACT

The present invention relates to an air conditioner for a vehicle, which can improve a gear ratio of a power transmission means in order to operate a sliding door with more torque. The air conditioner for a vehicle includes: an air-conditioning case having a heat exchanger; a first door and a second door disposed inside the air-conditioning case to adjust the degree of opening of an air passageway; a first driving part for operating the first door; a power transmission part connected to the first driving part; a second driving part for operating the second door; and a third driving part for connecting the power transmission part with the second driving part.

19 Claims, 14 Drawing Sheets

(56) References Cited

U.S. PATENT DOCUMENTS

2020/0001684 A1* 1/2020 Akiyama ........... B60H 1/00692

FOREIGN PATENT DOCUMENTS

| JP | 2007118753 A | 5/2007 |
|----|--------------|--------|
| JP | 2013018313 A | 1/2013 |
| JP | 2015-110404 A | 6/2015 |

* cited by examiner

PRIOR ART

AIR CONDITIONER FOR VEHICLE

This application claims the benefit of priority from Korean Patent Application Nos. 10-2018-0128969 filed on Oct. 26, 2018 and 10-2019-0110479 filed on Sep. 6, 2019, each of which is hereby incorporated by reference in its entirety.

BACKGROUND OF THE INVENTION

Field of the Invention

The present invention relates to an air conditioner for a vehicle, and more particularly, to an air conditioner for a vehicle which includes a sliding type door disposed inside an air-conditioning case to adjust the degree of opening of an air passageway of air discharged to the interior of the vehicle.

Background Art

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

FIG. 1 is a sectional view showing a conventional air conditioner for a vehicle. As shown in FIG. 1, the conventional air conditioner 1 for a vehicle includes an air-conditioning case 10, an air blower, an evaporator 2, a heater core 3, and temp doors 18 and 19.

An air inflow port 11 is formed at an inlet of the air-conditioning case 10, a defrost vent 12, a face vent 13 and a floor vent 14 for adjusting the degree of opening by mode doors 15, 16 and 17 are formed at an outlet of the air-conditioning case 10. The air blower is connected to the air inflow port 11 of the air-conditioning case 10 to blow indoor air or outdoor air.

The evaporator 2 and the heater core 3 are mounted inside the air-conditioning case 10 in an air flow direction in order. The temp doors 18 and 19 are mounted between the evaporator 2 and the heater core 3 in order to adjust temperature of air discharged to the interior of the vehicle by adjusting the degree of opening of a cold air passageway bypassing the heater core 3 and a warm air passageway passing the heater core 3. Cold air and warm air passing through cold air passageway and the warm air passageway are mixed together in a mixing zone, and then, are selectively discharged to the interior of the vehicle through the vents.

The temp doors are to selectively adjust the air passing the evaporator toward the heater core or in the direction to bypass the heater core. The temperature adjusting door is a single door formed in a flat door type or a dome door type which is rotated on a rotary shaft. FIG. 1 shows an example of two temp doors 18 and 19 disposed in the conventional air conditioner. As described above, the example that two temperature adjusting doors are disposed vertically may be applied to a structure to send air-conditioned air toward rear seats of the vehicle and a two-laminar flow structure for dividing air into indoor air and outdoor air and introduce into the interior of the vehicle.

Furthermore, FIG. 1 illustrates the temperature-adjusting door of the air conditioner in order to describe an operational structure of the door, but the door may be another door. Additionally, hereinafter, the temperature-adjusting door is called a 'door'. The first door 18 is connected to a first shaft 21 and slides by rotation of the first shaft 21, and the second door 19 is connected to a second shaft 22 and slides by rotation of the second shaft 22. The first shaft 21 and the second shaft 22 have gears, and the first door 18 and the second door 19 may have gear grooves engaging with the gears of the first and second shafts 21 and 22.

The two doors are connected to actuators and receive driving power to be operated. However, in this instance, since two actuators are disposed, the conventional air conditioner has a disadvantage in that the number of components is increased and manufacturing costs rise. Japanese Patent Publication No. 2015-110404 (published on Jun. 18, 2015) discloses a structure that two shafts for rotating two doors are connected with each other by a rack gear and a pinion gear in order to operate the two doors by just one actuator.

Because the conventional air conditioner for a vehicle having the structure to transmit driving power to two driving parts through rack gears includes a plurality of driving gears, it has several disadvantages in that driving power is not transferred smoothly due to a clearance between driving gears and in that the driving gears are separated and the separation of the driving gears causes malfunction. Additionally, the conventional air conditioner for a vehicle must solve the problem that foreign matters are introduced into the driving gears, door rotary shafts, and others.

Moreover, in case of the conventional air conditioner for a vehicle having the structure to transmit driving power to the two driving parts through rack gears, height of a guide rail must be reduced so that a sliding door support part is pressed more to restrict a leak of the temp door. In this instance, because friction force between the door and the rail increases, driving power must be transmitted with more torque in order to operate the sliding door.

PATENT LITERATURE

Patent Documents

Patent Document 1: Japanese Patent Publication No. 2015-110404 (Jun. 18, 2015).

SUMMARY OF THE INVENTION

Accordingly, the present invention has been made to solve the above-mentioned problems occurring in the prior arts, and it is an object of the present invention to provide an air conditioner for a vehicle, which can improve a gear ratio of a power transmission means in order to operate a sliding door with more torque.

It is another object of the present invention to provide an air conditioner for a vehicle, which has a sliding type door structure having a plurality of driving parts, thereby preventing separation of the driving parts, preventing malfunction due to a clearance, effectively prevent introduction of foreign matters, and making it easy to manufacture a mold.

To accomplish the above object, according to the present invention, there is provided an air conditioner for a vehicle, which includes an air-conditioning case having a heat exchanger, and a first door and a second door disposed inside the air-conditioning case to adjust the degree of opening of an air passageway, including: a first driving part for operating the first door; a power transmission part connected to the first driving part; a second driving part for operating the second door; and a third driving part for connecting the power transmission part with the second driving part.

Moreover, the air conditioner for a vehicle further includes: a first shaft having a gear part connected to the first door to slide the first door according to rotation; a rack gear connected to the gear part of the first shaft; a second shaft having a gear part connected to the second door to slide the second door according to rotation; and a pinion gear connecting the rack gear with the gear part of the second shaft to transmit driving power.

Furthermore, a driving power source is connected just to the first shaft in order to operate the first door by rotation of the first shaft, the rack gear moves to rotate the pinion gear, and the second shaft is rotated by rotation of the pinion gear to operate the second door.

Additionally, the first shaft, the second shaft and the pinion gear are all arranged at one side on the basis of the rack gear.

In addition, a diameter of the pinion gear is smaller than that of the gear part of the second shaft.

Moreover, the rack gear is formed in a straight shape, gear teeth are formed at one side in a sliding direction to be meshed with the gear part of the first shaft and gear teeth are formed at the other side to be meshed with the pinion gear.

Furthermore, the first door and the second door are arranged vertically to be spaced apart from each other and are temp doors for adjusting the degree of opening of an air passageway passing a heating heat exchanger and the degree of opening of an air passageway bypassing the heating heat exchanger.

Additionally, the air conditioner for a vehicle further includes a separation preventing means for preventing separation of the pinion gear.

In addition, the separation preventing means includes a pocket part, which receives the pinion gear to prevent separation of the pinion gear.

Moreover, the pocket part is formed concavely inside the separation preventing means in an axial direction in order to support the pinion gear from clearance in the axial direction, in a vertical direction and in a right-and-left direction.

Furthermore, the separation preventing means is formed to cover all of the first shaft, the rack gear, the second shaft and the pinion gear and prevents foreign matters from being introduced.

Additionally, the separation preventing means comprises a first shaft support part for supporting the first shaft, a rack gear support part for supporting the rack gear, and a second shaft support shaft for supporting the second shaft, and just one among the first shaft support part and the second shaft support part has a through hole combined with a shaft of the driving power source.

In addition, the first shaft, the rack gear, the second shaft and the pinion gear are disposed on the outer surface of the air-conditioning case to protrude, and the separation preventing means covers the first shaft, the rack gear, the second shaft and the pinion gear and is combined with the outer surface of the air-conditioning case.

Moreover, the separation preventing means includes a hook part, and the hook part is combined with a retaining hole formed in the air-conditioning case.

Furthermore, the hook part is formed at an end portion of one side near to the pinion gear in a longitudinal direction of the rack gear.

Additionally, the air-conditioning case includes an upper case and a lower case combined with a lower portion of the upper case, and the upper case has a protrusion formed at a lower end thereof to be combined with a groove formed in an upper end of the lower case. The retaining hole is formed side by side with a lateral surface of the protrusion.

In addition, the protrusion protrudes downwardly from the air-conditioning case, and the air-conditioning case has an extension portion extending downwardly from a position spaced apart from the protrusion in the axial direction, and the retaining hole is formed to penetrate the extension portion in the axial direction.

Moreover, the protruding direction of the protrusion and the penetrating direction of the retaining hole are formed at right angles to each other.

Furthermore, the separation preventing means includes a screw coupling portion formed for coupling with the air-conditioning case at a longitudinally central portion of the rack gear, and the hook part is formed at a lower end of the separation preventing means.

Additionally, the pinion gear includes a stepped portion formed concavely at an axial end portion thereof to correspond to a stepped portion of the separation preventing means.

The air conditioner for a vehicle according to an embodiment of the present invention can solve malfunction of the door due to clearance by separation and malfunction by backlash and hysteresis and effectively prevent foreign matters from being introduced since the separation preventing means holds the components of the sliding door driving part.

In addition, the air conditioner for a vehicle according to the present invention can solve the problem that the door is not operated smoothly due to increase of friction force when the height of the guide rail is reduced so that the sliding door support part is pressed more. Finally, the air conditioner for a vehicle according to the present invention can guarantee a smooth operation of the door and effectively prevent an air leak since making it possible to achieve closer pressing between the sliding door and the support part with the same driving power.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, technical structure of an air conditioner for a vehicle according to exemplary embodiments of the present invention will be described with reference to the accompanying drawings.

Figure 1:
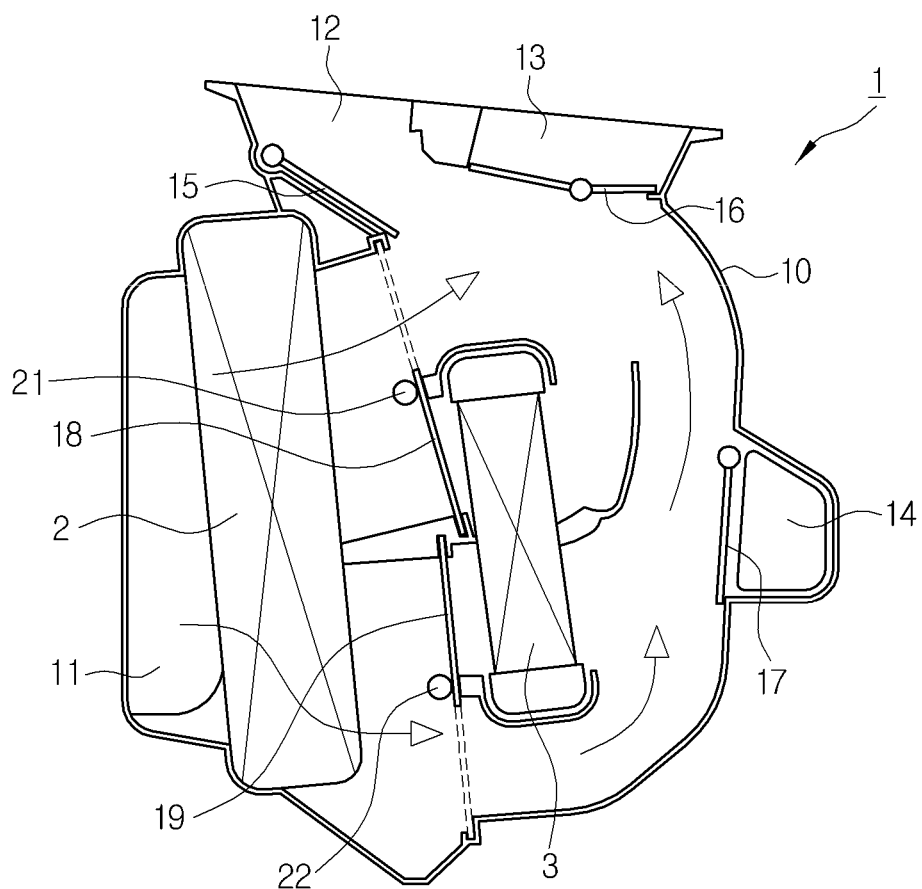
FIG. 1 is a sectional view of a conventional air conditioner for a vehicle.
Figure 2:
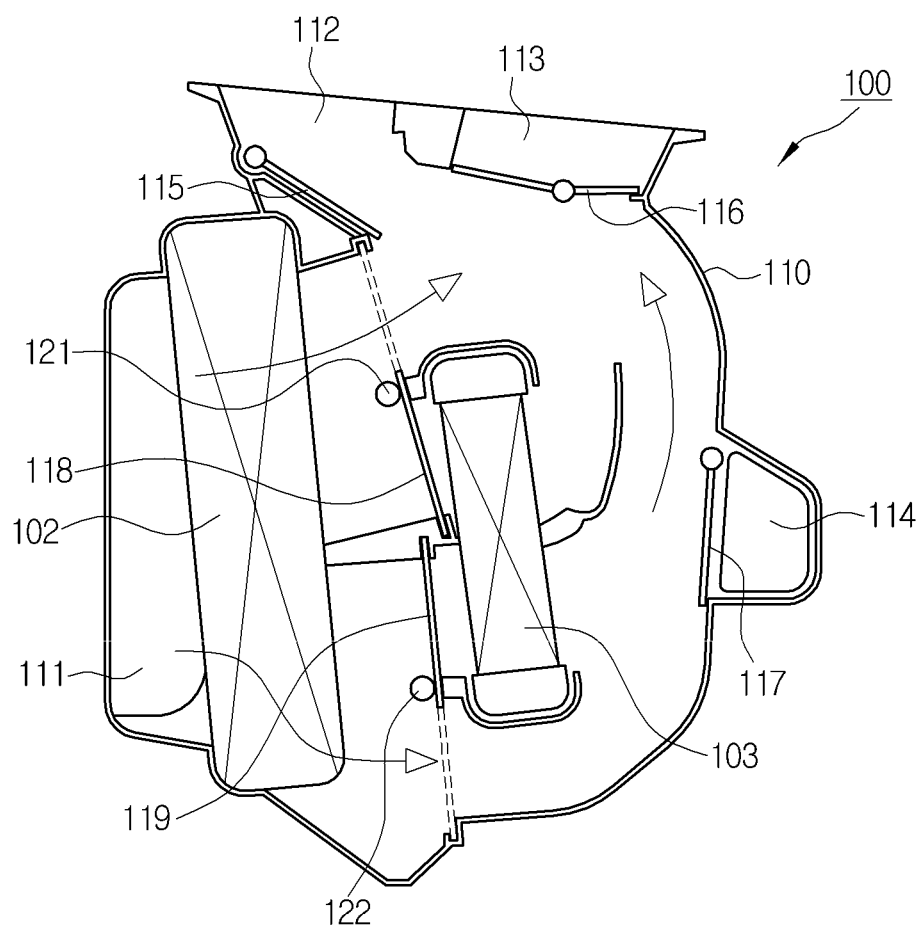
FIG. 2 is a sectional view of an air conditioner for a vehicle according to an embodiment of the present invention.
Figure 3:
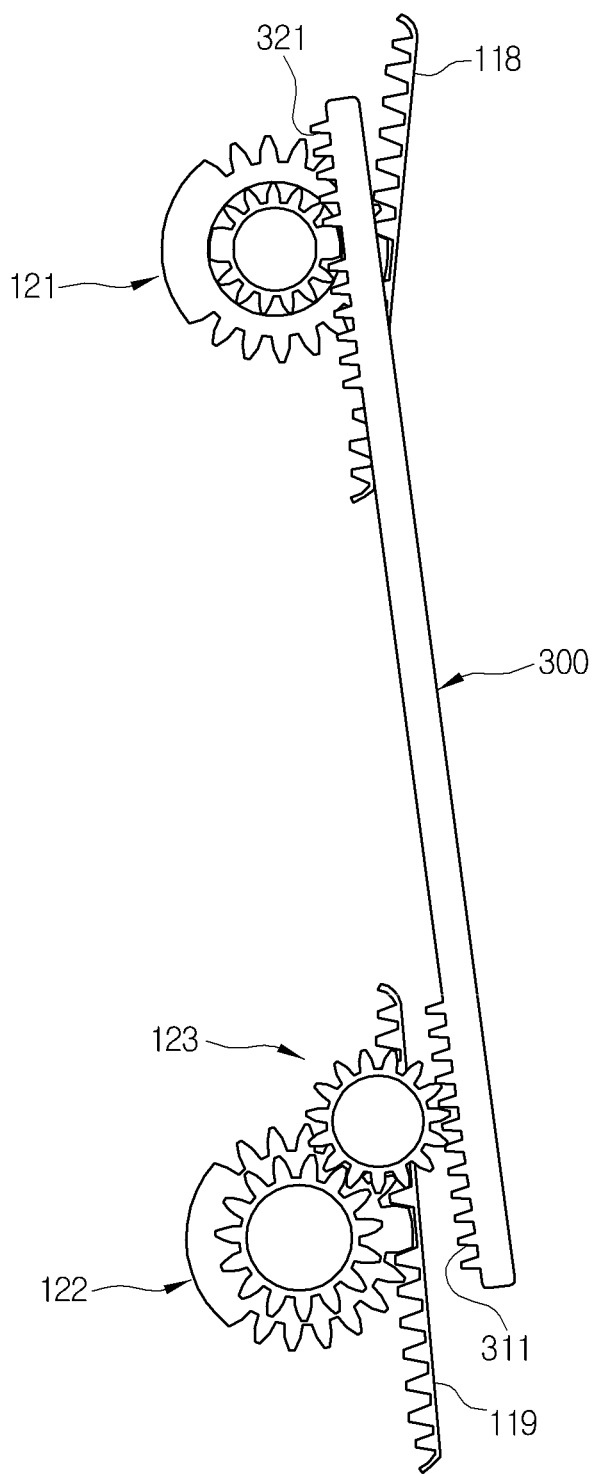
FIG. 3 is a side view showing doors, shafts and a rack gear according to the embodiment of the present invention.
Figure 4:
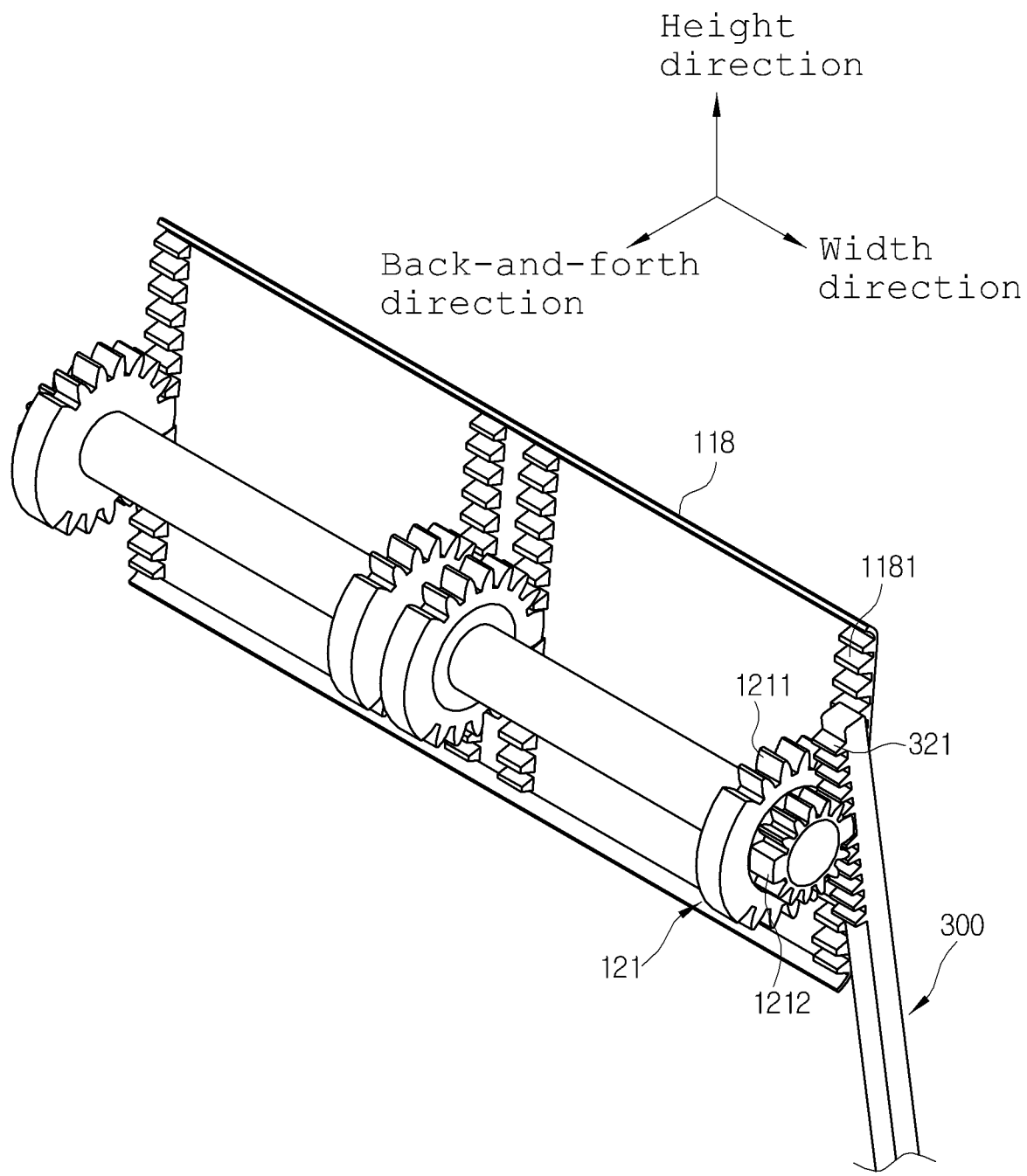
FIG. 4 is a perspective view showing a first door, a first shaft and a rack gear according to the embodiment of the present invention.
Figure 5:
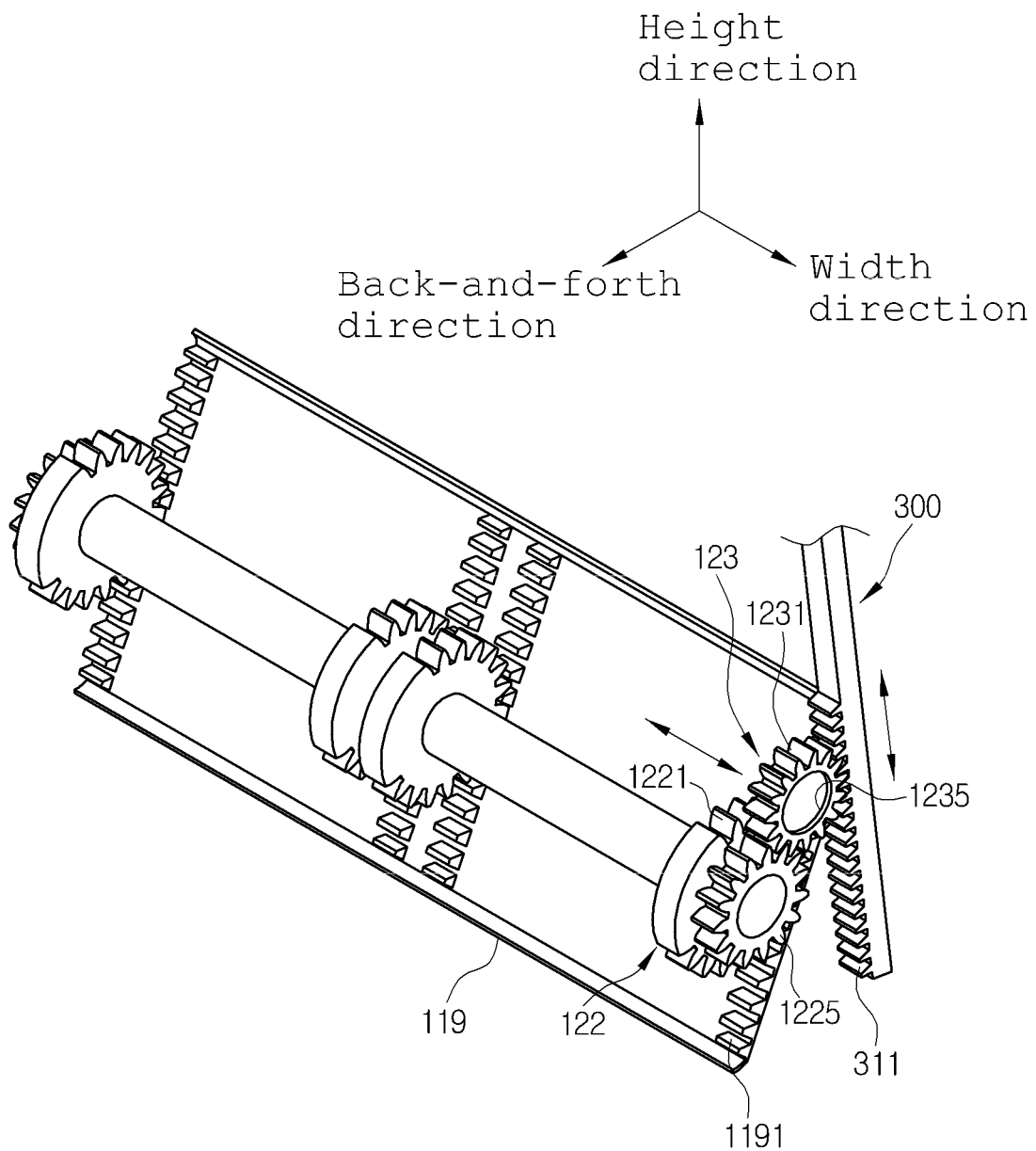
FIG. 5 is a perspective view showing a second door, a second shaft, a pinion gear and a rack gear according to the embodiment of the present invention.

FIG. 2 is a sectional view of an air conditioner for a vehicle according to an embodiment of the present invention, FIG. 3 is a side view showing doors, shafts and a rack gear according to the embodiment of the present invention, FIG. 4 is a perspective view showing a first door, a first shaft and a rack gear according to the embodiment of the present invention, and FIG. 5 is a perspective view showing a second door, a second shaft, a pinion gear and a rack gear according to the embodiment of the present invention.

Referring to FIGS. 2 to 5, the air conditioner 100 for a vehicle according to the embodiment of the present invention includes an air-conditioning case 110, an air blower, and a first door 118 and a second door 119. A cooling heat exchanger and a heating heat exchanger are disposed inside the air-conditioning case 110 in an air flow direction in order.

The cooling heat exchanger is an evaporator 102 which cools air by exchanging heat between refrigerant of a refrigerant cycle and air, and the heating heat exchanger is a heater core 103 which heats air by exchanging heat between cooling water of a cooling water line and air. The heating heat exchanger may be a heat exchanger using condensation heat of a heat pump system, a PTC heater actuated by electricity, or others.

The first door 118 and the second door 119 are disposed inside the air-conditioning case 110 to adjust the degree of opening of an air passageway. In this embodiment, the first door 118 and the second door 119 are arranged to be spaced apart from each other vertically, and are temperature-adjusting doors. The temperature-adjusting doors adjust the degree of opening of an air passageway passing through the heater core 103, which is the heating heat exchanger, and an air passageway bypassing the heater core 103.

An air inflow port 111 is formed at an inlet of the air-conditioning case 110, a defrost vent 112, a face vent 113 and a floor vent 114 for adjusting the degree of opening by mode doors 115, 116 and 117 are formed at an outlet of the air-conditioning case 110. The air blower is connected to the air inflow port 111 of the air-conditioning case 110 to blow indoor air or outdoor air. The evaporator 102 and the heater core 103 are mounted inside the air-conditioning case 110 in the air flow direction in order.

The temperature adjusting doors, namely, the first door and the second door, are mounted between the evaporator 102 and the heater core 103 in order to adjust temperature of air discharged to the interior of the vehicle by adjusting the degree of opening of a cold air passageway bypassing the heater core 103 and a warm air passageway passing through the heater core 103. Cold air and warm air passing through cold air passageway and the warm air passageway are mixed together in a mixing zone, and then, are selectively discharged to the interior of the vehicle through the vents.

The air conditioner 100 for a vehicle according to the embodiment of the present invention has two temperature-adjusting doors, namely, the first door 118 and the second door 119. As described above, the example that two temperature adjusting doors are disposed vertically may be applied to a structure to send air-conditioned air toward rear seats of the vehicle and a two-laminar flow structure for dividing air into indoor air and outdoor air and introduce into the interior of the vehicle.

The air conditioner 100 for a vehicle according to the embodiment of the present invention includes a plurality of driving parts for interworking the first door 118 and the second door 119. The driving part includes: a first driving part for operating the first door 118; a power transmission part connected to the first shaft; a second driving part for operating the second door 119; and a third driving part for connecting the power transmission part with the second shaft. In this embodiment, the first driving part has a first shaft 121, the second driving part has a second shaft 122, the third driving part has a pinion gear 123, and the power transmission part has a rack gear 300.

The first shaft 121 has a gear unit which is connected to the first door 118 in order to slidably move the first door 118 according to rotation. The second shaft 122 has a gear unit connected to the second door 119 to slidably move the second door 119 according to rotation. The rack gear 300 is connected to the gear part of the first shaft 121. The pinion gear 123 connects the rack gear 300 to the gear part of the second shaft 122 to transmit driving power. The first door 118 and the second door 119 respectively include temp doors, which are arranged to be spaced apart from each other vertically to adjust the degree of opening of the air passageway bypassing the air passageway passing the heater core 103 and the heater core 103.

The first door 118 is formed in a plate shape having a predetermined thickness. Gear teeth 1181 are formed at both sides of the first door 118 in a width direction of the vehicle. The width direction of the vehicle is an axial direction of the door. The gear teeth 1181 of the first door extends in a sliding direction of the door, and engage with the first shaft 121. The second door 119 is formed in a plate shape having a predetermined thickness. Gear teeth 1191 extend at both axial sides of the second door 119 in a sliding direction of the door and engage with the gear part 1221 of the second shaft 122.

The first shaft 121 includes: a shaft part formed long in a width direction; and a first gear part 1211 and a second gear part 1212 respectively combined with both longitudinal ends of the shaft part. The first gear part 1211 engages with gear teeth 1181 formed on the first door 118, and the first door 118 slides vertically according to the rotation of the first shaft 121. The second gear part 1212 is formed outside the first gear part 1211 in an axial direction, and is meshed with upper gear teeth 321 of the rack gear 300.

The second shaft 122 includes a shaft part formed long in the width direction; and a first gear part 1221 and a second gear part 1225 respectively combined with both longitudinal ends of the shaft part. The first gear part 1221 engages with gear teeth 1191 formed on the second door 119, and the second door 119 slides vertically according to the rotation of the second shaft 122. The second gear part 1225 is formed outside the first gear part 1221 in the axial direction, and is meshed with a gear part 1231 of the pinion gear 123. Moreover, the second shaft 122 is not directly connected to the rack gear 300 but is indirectly connected to the rack gear 300 by the medium of the pinion gear 123.

The first door 118 and the second door 119 is respectively operated by the first shaft 121 and the second shaft 122 in substance, and the rack gear 300 and the pinion gear 123 function to transmit driving power of a driving power source, which is connected to the first shaft 121, to the second shaft 122. As described above, the air conditioner for a vehicle having the pinion gear 123 can transmit driving power with higher torque than the air conditioner, whose rack gear is directly connected to the second shaft, through adjustment of a gear ratio.

Because driving power with higher torque can be transmitted from the first shaft 121 to the second shaft 122, the air conditioner for a vehicle according to the present invention can solve the problem that the door is not operated smoothly due to increase of friction force when the height of the guide rail is reduced so that the sliding door support part is pressed more. Finally, the air conditioner for a vehicle according to the present invention can guarantee a smooth operation of the door and effectively prevent an air leak since making it possible to achieve closer pressing between the sliding door and the support part with the same driving power.

Furthermore, the air conditioner for a vehicle having the pinion gear 123 can adjust a sliding width of the door through adjustment of the gear ratio so as to reduce a package size of the air-conditioning case and to adjust the degree of opening or closing of the air passageway of the door according to performance of the air conditioner.

The driving power source may be an actuator, and is connected just to the first shaft 121 and is not directly connected to the second shaft 122 and the pinion gear 123. The first door 118 slides and the rack gear 300 slides in the vertical direction, namely, in the height direction, by the rotation of the first shaft 121 in order to rotate the pinion gear 123. By the rotation of the pinion gear 123, the second shaft 122 is rotated so that the second door 119 slides.

The rack gear 300 is formed in a straight form, and the gear teeth 321 meshed with the second gear part 1212 of the first shaft 121 are formed on one side (upper side) in the sliding direction and gear teeth 311 meshed with the second gear part 1231 of the pinion gear 123 are formed on the other side (lower side). Additionally, the first shaft 121, the second shaft 122 and the pinion gear 123 are all arranged at one side on the basis of the rack gear 300. That is, the first shaft 121, the second shaft 122 and the pinion gear 123 are arranged at the front side in the back-and-forth direction of the vehicle on the basis of the rack gear 300.

Through the above structure, the width of the vehicle in the back-and-forth direction where the first shaft 121, the second shaft 122 and the pinion gear 123 occupy can be reduced so as to reduce the package size of the air conditioner.

Moreover, a diameter of the pinion gear 123 is smaller than a diameter of the gear part of the second shaft 122. Because the diameter of the pinion gear 123 is smaller than a diameter of the gear part of the second shaft 122, the second shaft 122 which is a driven shaft does 1/n rotation with respect to one rotation of the pinion gear 123 which is a driving shaft in order to increase rotational torque. If a gear ratio of the second shaft to the pinion gear is n:1, the more the gear ratio of the gear part of the second shaft to the pinion gear is, the more the rotational torque is.

Figure 6:
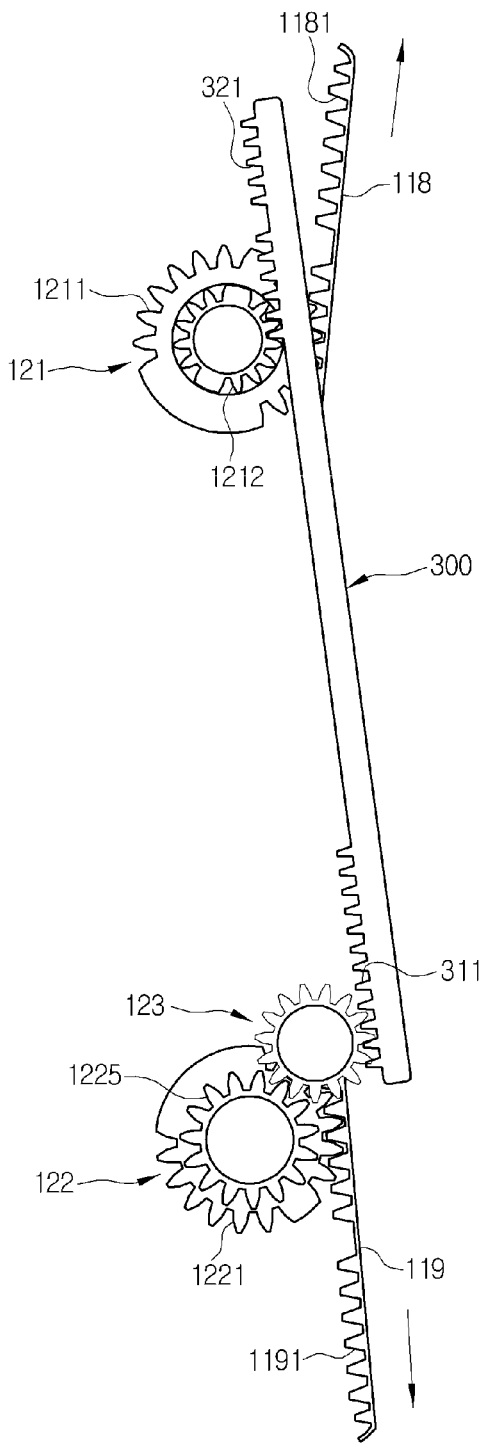
FIGS. 6 and 7 are side views showing an operational example of FIG. 3.
Figure 7:
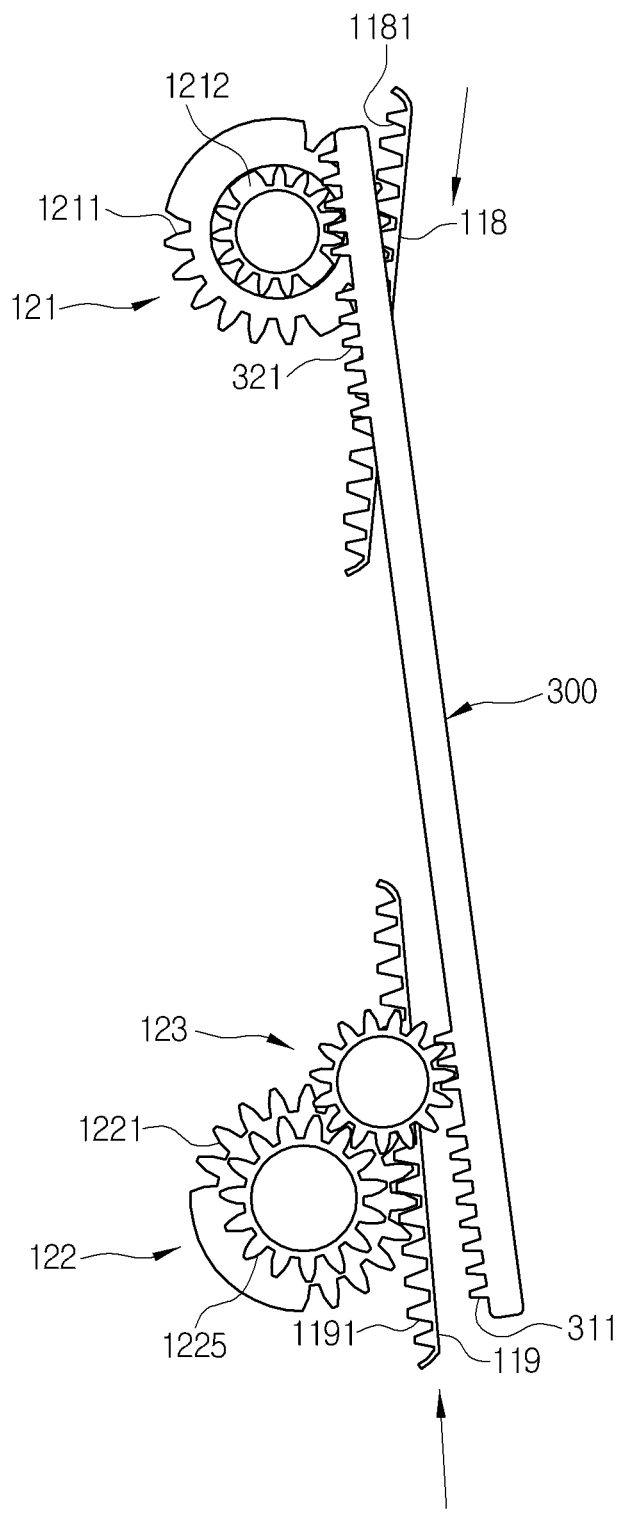

FIGS. 6 and 7 are side views showing an operational example of FIG. 3.

As shown in FIG. 6, when the first shaft 121 rotates in the counterclockwise direction, the first door 118 engaging with the first shaft 121 slides upwardly, and at the same time, the rack gear 300 moves upwardly. The pinion gear 123 connected to a lower portion of the rack gear 300 rotates in the counterclockwise direction, and the second shaft 122 engaging with the pinion gear 123 rotates in the clockwise direction. The second door 119 connected to the second shaft 122 slides downwardly. The first door 118 and the second door 119 move in the direction that they get farther apart from each other.

As shown in FIG. 7, when the first shaft 121 rotates in the clockwise direction, the first door 118 engaging with the first shaft 121 slides downwardly, and at the same time, the rack gear 300 moves downwardly. The pinion gear 123 connected to the lower portion of the rack gear 300 rotates in the clockwise direction, and the second shaft 122 engaging with the pinion gear 123 rotates in the counterclockwise direction. The second door 119 connected to the second shaft 122 slides upwardly. The first door 118 and the second door 119 move in the direction that they get closer to each other.

Figure 8:
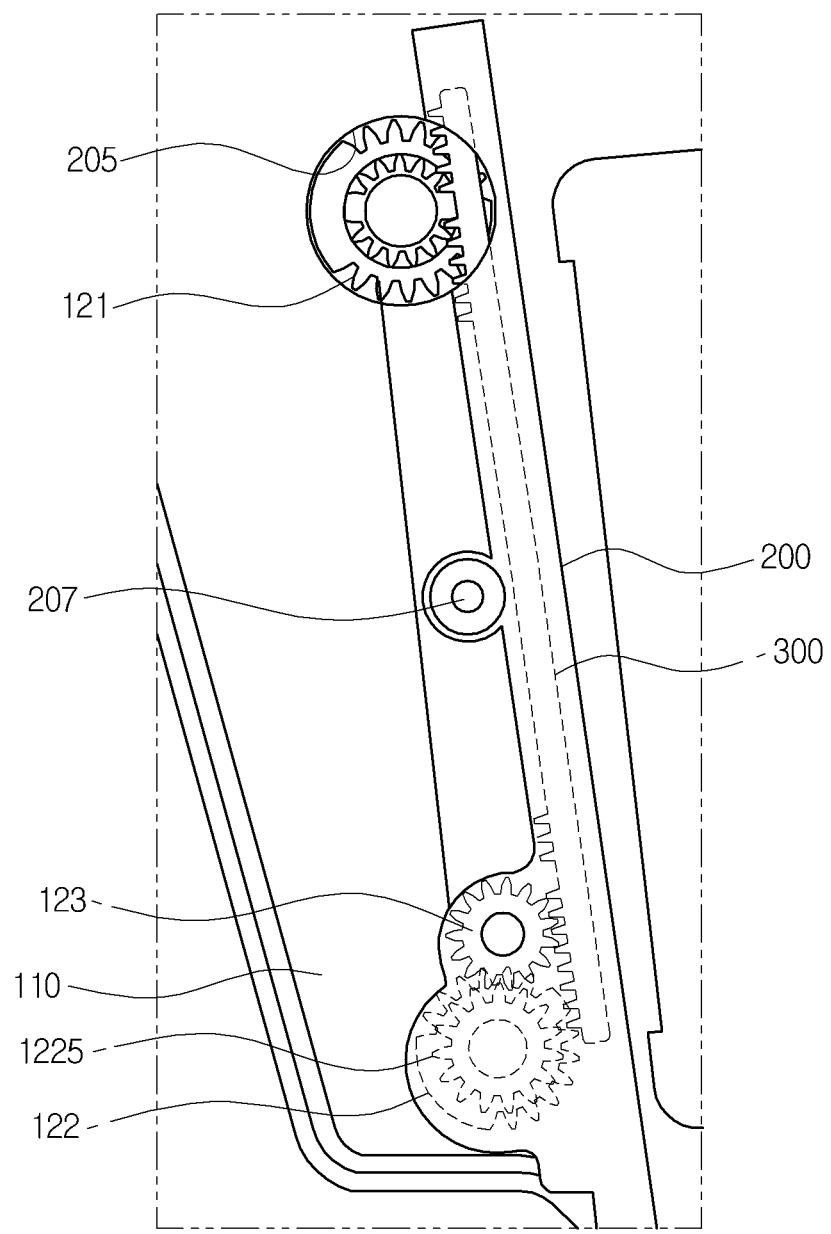
FIG. 8 is a side view showing a state where a separation preventing means is combined with an air-conditioning case according to the embodiment of the present invention.
Figure 9:
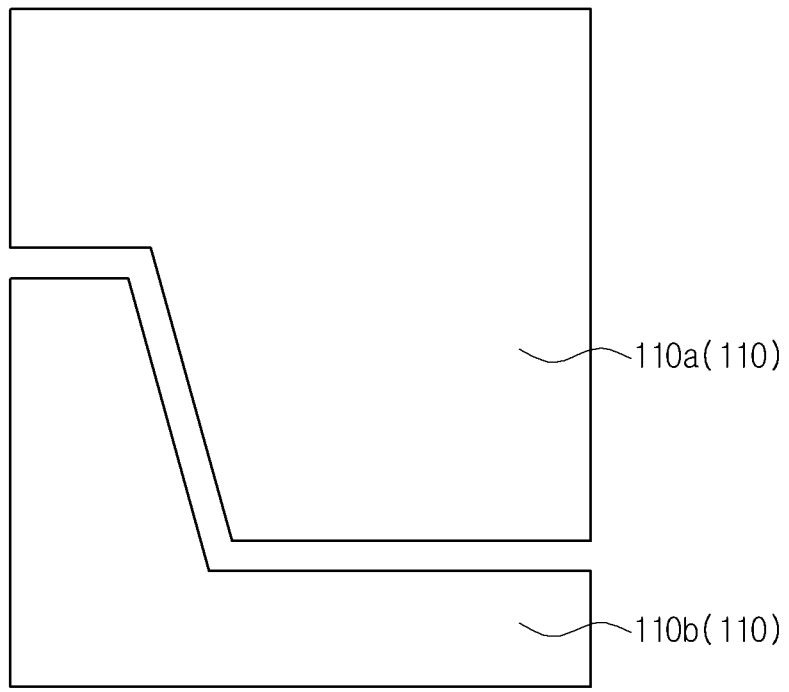
FIG. 9 is a view showing an upper case and a lower case according to the embodiment of the present invention.
Figure 10:
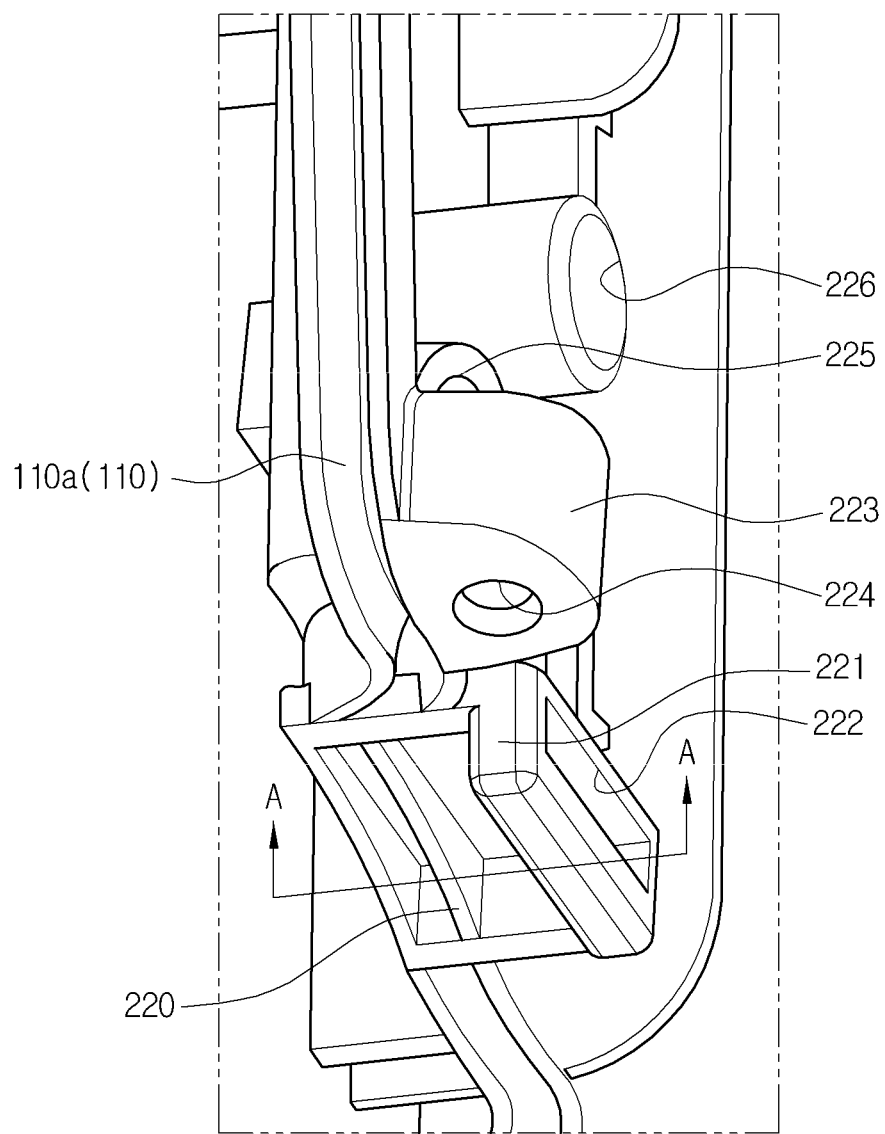
FIG. 10 is a bottom perspective view of the upper case.
Figure 11:
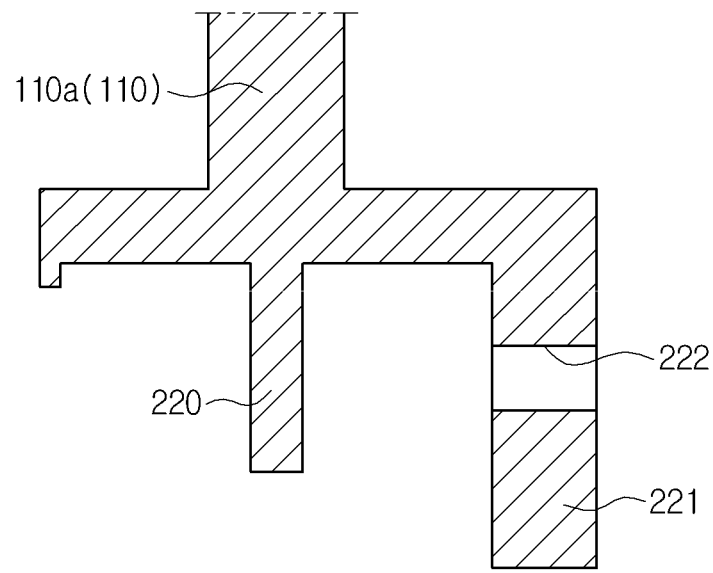
FIG. 11 is a sectional view taken along the line of A-A of FIG. 10.
Figure 12:
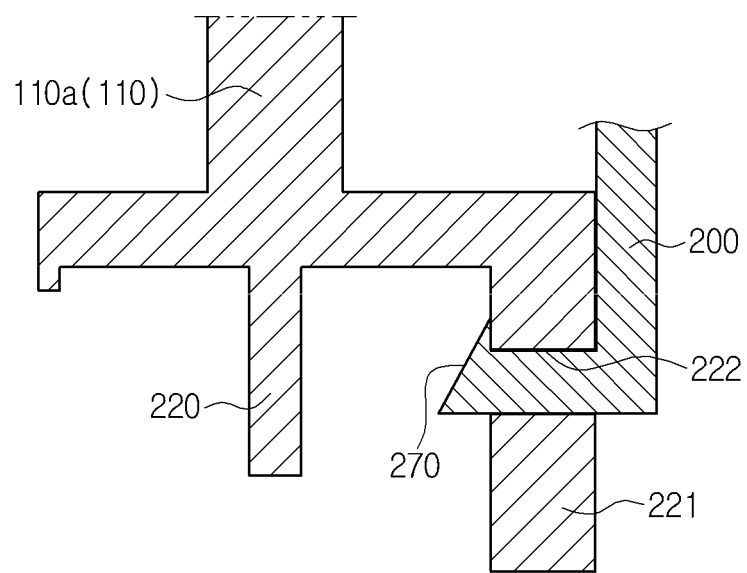
FIG. 12 is a sectional view showing a state where the separation preventing means is combined with the upper case of FIG. 11.
Figure 13:
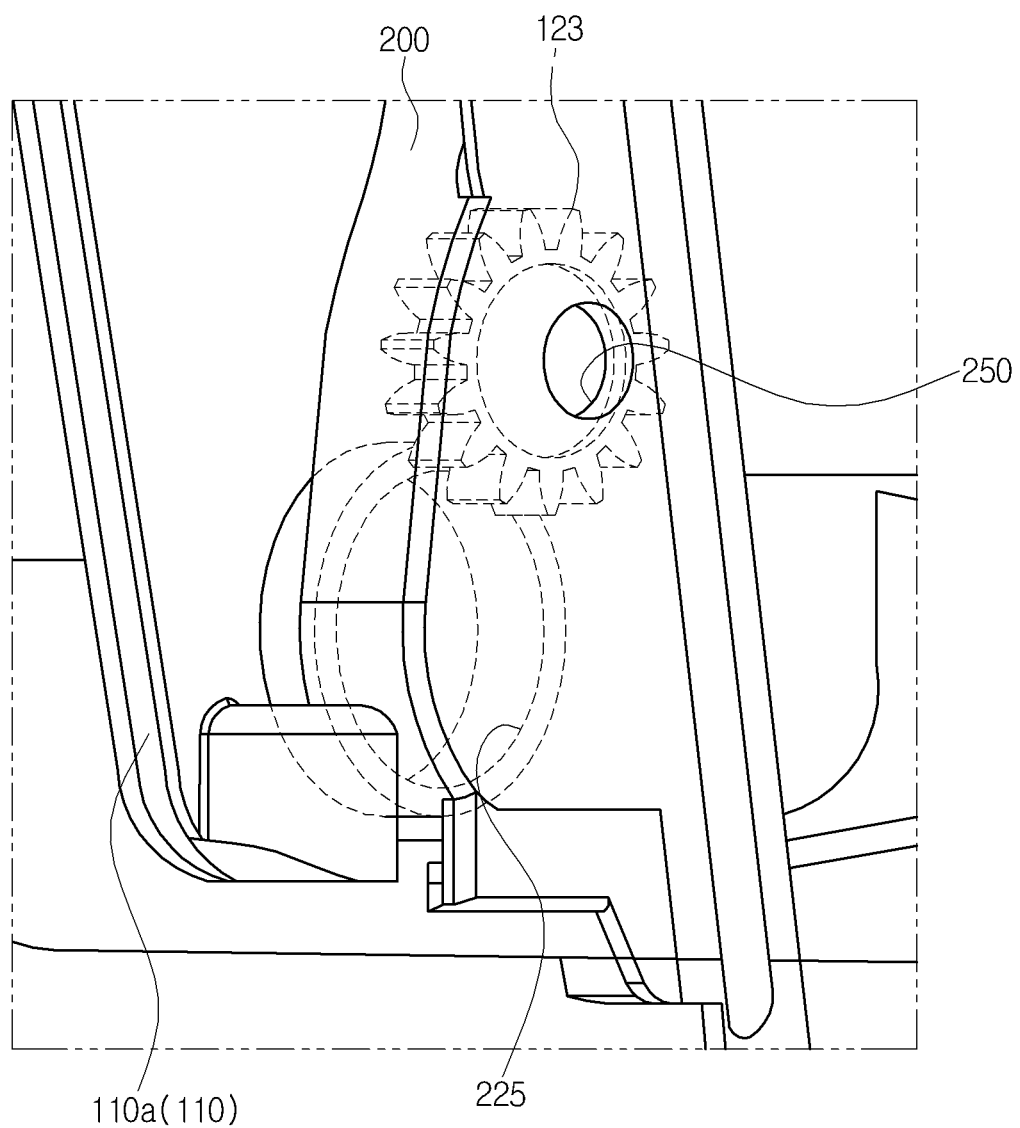
FIG. 13 is a perspective view showing the separation preventing means and a pocket part according to the embodiment of the present invention.
Figure 14:
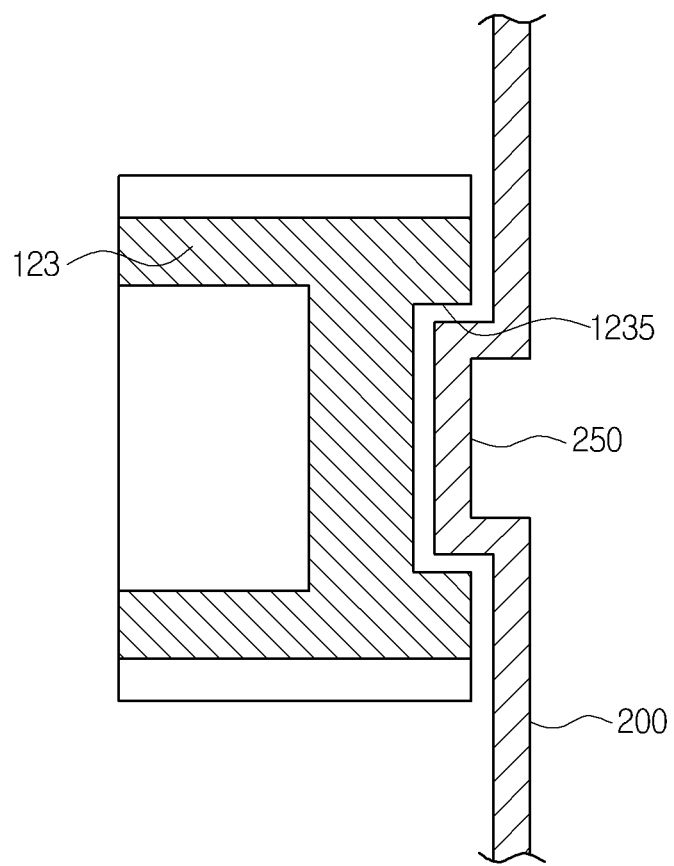
FIG. 14 is a sectional view showing the pinion gear and the pocket part according to the embodiment of the present invention.

FIG. 8 is a side view showing a state where a separation preventing means is combined with an air-conditioning case according to the embodiment of the present invention, FIG. 9 is a view showing an upper case and a lower case according to the embodiment of the present invention, FIG. 10 is a bottom perspective view of the upper case, FIG. 11 is a sectional view taken along the line of A-A of FIG. 10, FIG. 12 is a sectional view showing a state where the separation preventing means is combined with the upper case of FIG. 11, FIG. 13 is a perspective view showing the separation preventing means and a pocket part according to the embodiment of the present invention, and FIG. 14 is a sectional view showing the pinion gear and the pocket part according to the embodiment of the present invention.

Referring to FIGS. 8 to 14, the air conditioner for a vehicle according to the embodiment of the present invention includes a separation preventing means 200. The separation preventing means 200 fixes the driving part to prevent the driving part from being separated.

Moreover, the separation preventing means 200 is formed to cover all of the first shaft 121, the rack gear 300, the second shaft 122, and the pinion gear 123. That is, the separation preventing means 200 has the function to fix the driving part and a function as a dust cover to prevent foreign matters from being introduced into the driving part.

In detail, the separation preventing means 200 includes a first shaft support part for supporting the first shaft 121, a rack gear support part for supporting the rack gear 300, and a second shaft support part for supporting the second shaft 122. The first shaft support part, the second shaft support part and the rack gear support shaft are respectively formed corresponding to the first shaft 121, the second shaft 122 and the rack gear 300, and the rack gear support part has a sufficient length in consideration of the sliding width of the rack gear 300.

In this instance, just one among the first shaft support part and the second shaft support part has a through hole 205 combined with a shaft of the driving power source. In this embodiment, the through hole 205 is formed only in the first shaft support part, so the driving power source is connected just to the first shaft 121. Because the through hole 205 is formed just in the first shaft 121, it minimizes exposure of the driving part in order to enhance the foreign matter blocking function.

Furthermore, the separation preventing means 200 includes a pocket part 250 which receives the pinion gear 123 and prevents separation of the pinion gear 123. As shown by an arrow of FIG. 5, when the rack gear 300 moves vertically and the pinion gear 123 rotates, a clearance by separation in the axial direction (width direction), in a right-and-left direction (back-and-forth direction), and in the vertical direction (height direction) is absorbed at the pinion gear 123 so that driving power is not transmitted to the door.

The first shaft 121, the rack gear 300, the second shaft 122 and the pinion gear 123 are all protrudingly formed on the outer surface of the air-conditioning case 110. The shaft parts of the first shaft 121 and the second shaft 122 are all located inside the air-conditioning case 110, and just the gear parts penetrate through the air-conditioning case 110 and are located outside the air-conditioning case 110. In FIG. 10, the reference numeral 225 designates a hole through which the second shaft 122 penetrates. It is preferable that the rack gear 300 be connected to the rail formed outside the air-conditioning case 110 to be able to slide.

The pinion gear 123 is connected to a shaft fixing part 226 formed outside the air-conditioning case 110 to be able to idle. The pocket part 250 includes a stepped portion, which is formed concavely inside the separation preventing means 200 in the axial direction and presses the pinion gear. The pocket part 250 supports the pinion gear 123 from the clearance of the axial direction (width direction), the vertical direction (height direction), and the right-and-left direction (back-and-forth direction), in order to transmit driving power to the second door 119 smoothly.

In this instance, the stepped portion 1235 formed concavely corresponding to a stepped portion of the separation preventing means 200 is disposed at an axial end portion of the pinion gear 123. When the pinion gear 123 rotates, the stepped portion 1235 of the pinion gear 123 prevents interference of the pocket part 250 in order to prevent a smooth rotation and increase restraining force by the pocket part 200 of the separation preventing means 200. Therefore, bearing force of the axial direction, the vertical direction and the right-and-left direction is increased to hold the clearance of the pinion gear 123, so that malfunction due to backlash and hysteresis can be prevented.

The separation preventing means 200 is combined with the outer surface of the air-conditioning case 110 to cover the first shaft 121, the rack gear 300, the second shaft 122, and the pinion gear 123. The air-conditioning case 110 includes an upper case 110a and a lower case 110b. The lower case 110b is combined with a lower portion of the upper case 110a. The upper case 110a includes a combining portion 223 formed protrudingly and an assembly hole 224 vertically passing through the combining portion 223. Additionally, the lower case 110b includes a combining portion corresponding to the combining portion 223 of the upper case, so the upper case 110a and the lower case 110b are combined with each other by a screw coupled to the assembly hole 224.

The upper case 110a and the lower case 110b are combined with each other by a tongue and groove joint structure. That is, the upper case 110a has a protrusion 220 formed at a lower end thereof. Moreover, the lower case 110b has a recess formed concavely at an upper end thereof. The protrusion 220 of the upper case 110a is inserted into the recess of the lower case 110b so that the combining force between the upper case 110a and the lower case 110b is increased.

The separation preventing means 200 includes a screw coupling portion 207. The screw coupling portion 207 is formed for coupling with the air-conditioning case 110, and just one screw coupling portion 207 is formed at a longitudinally central portion of the rack gear 300. Furthermore, the separation preventing means 200 includes a hook part 270, and the air-conditioning case 110 has a retaining hole 222 for joining the hook part 270. In this instance, the hook part 270 is formed at an end portion of one side near to the pinion gear 123 in the longitudinal direction of the rack gear 300.

That is, the hook part 270 is formed at a lower end of the separation preventing means 200. Because the pinion gear 123 is arranged near to the lower portion of the separation preventing means 200 adjacent to the second shaft 122, the lower end of the separation preventing means 200 is firmly fixed to the air-conditioning case 110 by the hook part 270 formed at the lower end of the separation preventing means 200. Therefore, bearing force and fixing force of the pinion gear 123 can be increased.

One screw coupling portion 207 is disposed at the central portion of the separation preventing means 200, and the hook part 270 is disposed at the lower end of the separation preventing means 200. Through the above structure, the number of the screw coupling parts is minimized, combining force between the separation preventing means 200 and the air-conditioning case 110 is increased, and especially, driving power is securely transmitted since the hook part 270 holds the clearance of the pinion gear 123 at the lower portion of the separation preventing means 200, which requires the highest fixing force of the pinion gear 123.

In more detail, the protrusion 220 is formed from the bottom surface of the air-conditioning case 110 in the downward direction. The air-conditioning case 110 includes an extension portion 221. The extension portion 221 extends downwardly from a position spaced apart from the protrusion 220 in the axial direction. The retaining hole 222 penetrates through the extension portion 221 in the axial direction. That is, the retaining hole 222 is formed side by side with the lateral surface of the protrusion 220.

In this instance, the protruding direction of the protrusion 220 and the penetrating direction of the retaining hole 222 are formed at right angles to each other. That is, the protrusion 220 is formed to protrude in the downward direction, and the retaining hole 222 is formed in the lateral direction, so that the hook part 270 is inserted into the retaining hole 222 at right angles to the protrusion 220.

Figure 15:
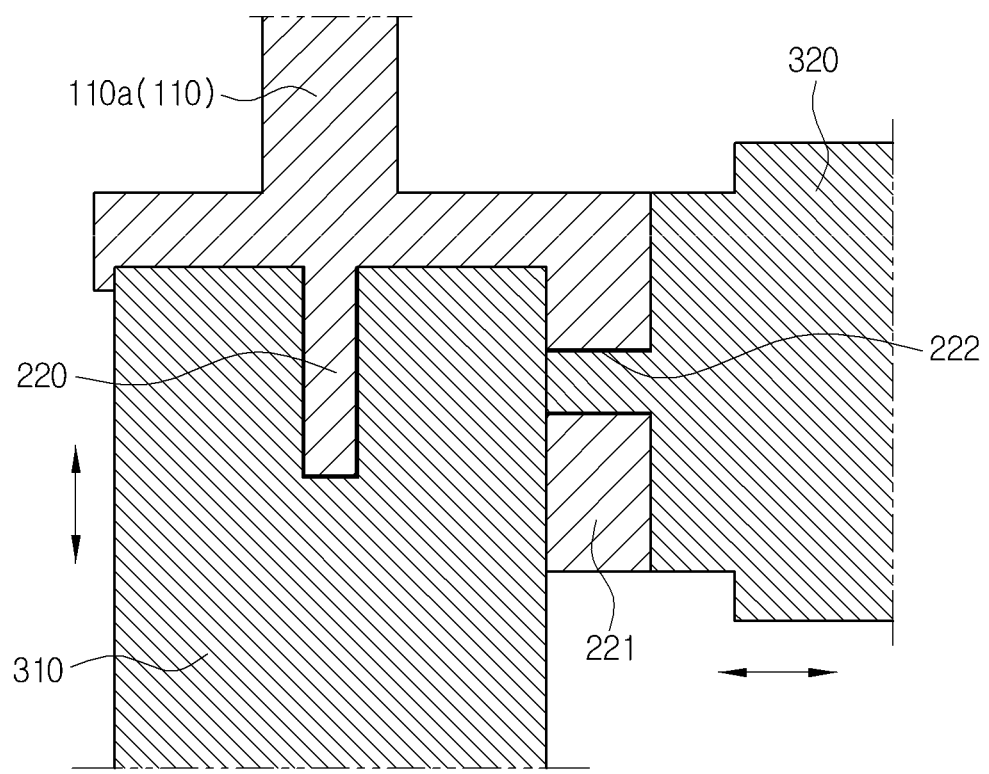
FIG. 15 is a view showing a mold for forming the upper case of FIG. 11.

FIG. 15 is a view showing a mold for forming the upper case of FIG. 11. Referring to FIG. 15, because the protruding direction of the protrusion 220 and the penetrating direction of the retaining hole 222 are formed at right angles to each other, a mold can be taken out easily and the mold can be manufactured in a simple structure so as to enhance manufacturing performance.

That is, a first mod 310 having a groove formed at an upper end is formed in order to form the protrusion 220 on the lower surface of the air-conditioning case 110, and a second mold 320 having a protrusion formed at a lateral side is formed in order to form the retaining hole 222 at the extension portion 221 of the air-conditioning case. After completion of molding of the air-conditioning case 110, the second mod 320 is first taken out, and then, the first mold 310 is taken out. Then, the protrusion 220 and the retaining hole 22 are formed.

The driving power of the actuator (driving power source) is transmitted to the gear part of the first shaft, the rack gear, the pinion gear, the gear part of the second shaft, and the second door in order. During transmission of the driving power, the separation preventing means minimizes clearance among the components and introduction of foreign matters. That is, the air conditioner for a vehicle according to the present invention can solve malfunction of the door due to clearance by separation and malfunction by backlash and hysteresis since the separation preventing means holds the components of the sliding door driving part.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle, which includes an air-conditioning case having a heat exchanger, and a first door and a second door disposed inside the air-conditioning case to adjust a degree of opening of an air passageway, comprising:
    a first shaft having a gear part connected to the first door to slide the first door according to rotation;
    a rack gear connected to the gear part of the first shaft;
    a second shaft having a gear part connected to the second door to slide the second door according to rotation;
    a pinion gear connecting the rack gear with the gear part of the second shaft to transmit driving power; and
    a separation preventing means coupled to an outer surface of the air-conditioning case to cover the first shaft, the rack gear, the second shaft, and the pinion gear and to prevent the pinion gear from being separated.

2. The air conditioner according to claim 1, wherein a driving power source is connected just to the first shaft in order to operate the first door by rotation of the first shaft, the rack gear moves to rotate the pinion gear, and the second shaft is rotated by rotation of the pinion gear to operate the second door.

3. The air conditioner according to claim 1, wherein the first shaft, the second shaft and the pinion gear are all arranged at one side on the basis of the rack gear.

4. The air conditioner according to claim 3, wherein the rack gear is formed in a straight shape, gear teeth are formed at one side in a sliding direction to be meshed with the gear part of the first shaft and gear teeth are formed at an other side to be meshed with the pinion gear.

5. The air conditioner according to claim 1, wherein a diameter of the pinion gear is smaller than that of the gear part of the second shaft.

6. The air conditioner according to claim 1, wherein the first door and the second door are arranged vertically to be spaced apart from each other and are temperature doors for adjusting a degree of opening of an air passageway passing a heating heat exchanger and a degree of opening of an air passageway bypassing the heating heat exchanger.

7. The air conditioner according to claim 1, wherein the separation preventing means includes a pocket part, which receives the pinion gear to prevent separation of the pinion gear.

8. The air conditioner according to claim 7, wherein the pocket part is formed concavely inside the separation preventing means in an axial direction in order to support the pinion gear from clearance in the axial direction, in a vertical direction and in a right-and-left direction.

9. The air conditioner according to claim 8, wherein the pinion gear includes a stepped portion formed concavely at an axial end portion thereof to correspond to a stepped portion of the separation preventing means.

10. The air conditioner according to claim 1, wherein the separation preventing means is formed to cover all of the first shaft, the rack gear, the second shaft and the pinion gear and prevents foreign matters from being introduced.

11. The air conditioner according to claim 1, wherein the separation preventing means comprises a first shaft support part for supporting the first shaft, a rack gear support part for supporting the rack gear, and a second shaft support shaft for supporting the second shaft, and
    wherein just one among the first shaft support part and the second shaft support part has a through hole combined with a shaft of the driving power source.

12. The air conditioner according to claim 1, wherein the first shaft, the rack gear, the second shaft and the pinion gear are disposed on the outer surface of the air-conditioning case to protrude, and
    wherein the separation preventing means covers the first shaft, the rack gear, the second shaft and the pinion gear and is combined with the outer surface of the air-conditioning case.

13. The air conditioner according to claim 12, wherein the separation preventing means includes a hook part, and the hook part is combined with a retaining hole formed in the air-conditioning case.

14. The air conditioner according to claim 13, wherein the hook part is formed at an end portion of one side near to the pinion gear in a longitudinal direction of the rack gear.

15. The air conditioner according to claim 13, wherein the air-conditioning case includes an upper case and a lower case combined with a lower portion of the upper case, and the upper case has a protrusion formed at a lower end thereof to be combined with a groove formed in an upper end of the lower case, and
    wherein the retaining hole is formed side by side with a lateral surface of the protrusion.

16. The air conditioner according to claim 15, wherein the protrusion protrudes downwardly from the air-conditioning case, and the air-conditioning case has an extension portion extending downwardly from a position spaced apart from the protrusion in the axial direction, and
    wherein the retaining hole is formed to penetrate the extension portion in the axial direction.

17. The air conditioner according to claim 16, wherein the protruding direction of the protrusion and the penetrating direction of the retaining hole are formed at right angles to each other.

18. The air conditioner according to claim 13, wherein the separation preventing means includes a screw coupling portion formed for coupling with the air-conditioning case at a longitudinally central portion of the rack gear, and the hook part is formed at a lower end of the separation preventing means.

19. An air conditioner for a vehicle, which includes an air-conditioning case having a heat exchanger, and a first door and a second door disposed inside the air-conditioning case to adjust a degree of opening of an air passageway, comprising:
    a first shaft having a gear part connected to the first door to slide the first door according to rotation;
    a rack gear connected to the gear part of the first shaft;
    a second shaft having a gear part connected to the second door to slide the second door according to rotation;
    a pinion gear connecting the rack gear with the gear part of the second shaft to transmit driving power; and a separation preventing means for preventing separation of the pinion gear.

\* \* \* \* \*